Patented Feb. 10, 1925.

1,525,806

UNITED STATES PATENT OFFICE.

WILLIAM ADOLF FRAYMOUTH, OF BHOPAL, INDIA, ASSIGNOR TO THE BHOPAL PRODUCE TRUST LIMITED, OF BHOPAL, CENTRAL INDIA, A CORPORATION OF BHOPAL STATE.

RECOVERY OF CALCIUM OXALATE FROM THE BARK OF TREES.

No Drawing.    Application filed July 17, 1923. Serial No. 652,006.

*To all whom it may concern:*

Be it known that I, WILLIAM ADOLF FRAYMOUTH, a subject of His Majesty King George V, and resident of Bhopal, Bhopal State, Central India, chemical engineer, have invented certain new and useful Improvements in the Recovery of Calcium Oxalate from the Bark of Trees, of which the following is a specification.

This invention relates to the recovery of calcium oxalate and other substantially insoluble oxalates from trees.

The bark of the *Terminalia arjuna* (known under the names Arjun, Urjoon, Kahua, Koha) is known to contain tannin and other water-soluble matter. We have now found that the bark of the *Terminalia arjuna* and of other trees also contains crystalline calcium oxalate. Other trees which are found to contain calcium oxalate are hereinafter referred to as "like trees."

The percentage of calcium oxalate contained in the bark of these trees varies considerably, but in the dry bark of the *Terminalia arjuna* tree up to 50% by weight may exist. This natural crystalline calcium oxalate differs from the calcium oxalate as generally known. The latter is an amorphous precipitate while the former appears in a crystalline form, but both can be converted by the addition of sulphuric acid or other re-agents into oxalic acid or other oxalates.

According to this invention, a process for obtaining calcium oxalate or other substantially insoluble oxalates consists in extracting the crystalline calcium oxalate from the *Terminalia arjuna* or like trees.

According to this invention, the first step is to take the bark from the tree; and the crystalline calcium oxalate is extracted therefrom. The bark employed may be live bark or the dead scabs or flakes from the bark of the trees, or the bark or root bark can be taken from fallen trees.

Preferably, according to this invention, a process for obtaining calcium oxalate or other substantially insoluble oxalates consists in taking the bark of the *Terminalia arjuna* or like trees, crushing it sufficiently finely to liberate contained crystals of calcium oxalate from the remainder of the bark, and subjecting the resulting material to physical concentration. The expression "physical concentration" includes any method of separating from one another two pulverulent solids by means of the difference in their physical characteristics.

Preferably, according to this invention, the soluble matters (for example tannin) in the bark are extracted therefrom prior to concentration.

According to one feature of this invention, a process for the treatment of the bark of the *Terminalia arjuna* or like trees consists in crushing it finely, removing fibrous matter, thereafter extracting with water to remove soluble substances, and finally subjecting the material to physical concentration so as to obtain crystalline calcium oxalate.

The physical concentration may be effected by subjecting the powdered material in a dry condition to the action of an air current, for example an air-current separator, or by winnowing or like method.

Again, the physical concentration may be effected by subjecting the crushed material (preferably after extraction of the tannin) to water concentration of the kind employed for the concentration of ores, e. g. by jigs, vanners, shaking tables, spitzkasten, centrifugal separators, classifiers and the like.

A preferred process acording to this invention for obtaining calcium oxalate or other substantially insoluble oxalates consists in taking the bark from the *Terminalia arjuna* or like trees, crushing it finely to liberate contained crystals of calcium oxalate from the remainder, (preferably removing fibrous matter), extracting with water to remove soluble substances and subjecting the residue in aqueous suspension to the action of a centrifugal separator with impervious basket to separate out the calcium oxalate.

The following is a description of various methods of carrying this invention into practical effect. As already stated, the first step in the process of recovering calcium oxalate from the *Terminalia arjuna* or like trees consists in taking the bark from the tree.

The bark is then crushed or ground up into a fine powder. The fibrous part of the bark when separated contains little or no tannin or calcium oxalate. It is preferable, therefore, to separate the fibrous matter from the cementing matters, secretions, gums, and other non-fibrous portions which are rich in tannin and calcium oxalate, by a process which is already known in the extraction of tannin from bark.

The pulverulent residue may be subjected to the action of an air current for the purpose of separating those particles which are readily suspended in the air current from the calcium oxalate particles (which are heavier than the other portions of the bark and fall more readily through the air).

It is preferable to employ wet methods of concentration. The bark is first crushed to a fine powder, say to 100 mesh to the linear inch. Unless this fine crushing is carried out, all the cells are not opened up and the finest particles of oxalate are not liberated. As already stated, the fibrous parts may then be separated. In any event the crushed material or fine powder extracted therefrom is then made into a pulp with water and the oxalate recovered therefrom by wet concentration methods. Any of the water gravity separators, such as spitzkasten, jigs, buddles, log-washers, vanners, concentrating tables, classifiers, or the like may be used. The fineness of crushing which is desirable may make it difficult to separate the finest particles, but some of the latest slime concentrators used for the treatment of ores can successfully be used for this purpose, such as those which have mechanical contrivances for removal of heavier materials after settlement, while at the same time lighter materials are floated off.

Good results can be obtained by wet concentration in a centrifugal separator with an impervious basket.

It is difficult to extract all the calcium oxalate unless practically all the tannin and other soluble contents of the bark have been extracted first. In the bark of the *Terminalia arjuna* the amount of tannin and other soluble constituents is large, amounting to about 32% of the weight of the bark. The presence of the tannin increases the specific gravity of the cells of the bark and thus renders separation by gravity methods from the heavier calcium oxalate crystals less easy.

It is therefore preferred to carry out the process in the following manner:—

The dry bark of the *Terminalia arjuna* or like trees is crushed to a powder fine enough to liberate as far as possible all the crystals from the cells in the bark. This is preferably done in known manner by crushing and beating the material so that the fibrous part (which contains little or no tannin or oxalate) is broken up into wool and separated from the cementing matter, secretions, gums or other non-fibrous substance. The powdered bark is then wetted with a minimum of water in a suitable apparatus. After transference to the said apparatus some of the oxalate, being heavier than the rest of the pulp, may be removed either intermittently or continuously, during the running of the plant.

The pulp with as little water or liquor as possible is then mixed thoroughly to an even cream-like consistency, and passed into a centrifugal machine with impervious walls. The walls may conveniently be lined with detachable plates on which the solid matter is deposited and by means of which it may be readily removed. An almost perfect separation takes place, for the oxalate being heavier than the bark residue is all deposited in the outside precipitation layer of the centrifugal machine. The bark residue or refuse is deposited in the next layer and the tannin liquor passes out of the machine free from bark residue or oxalate. On stopping the machine and removal of the plates the oxalate and the bark residue may be removed separately.

Having now particularly described and ascertained the nature of my said invention and the manner the same is to be performed, I declare that what I claim is:—

1. A process for obtaining substantially insoluble oxalates consisting in taking the bark of trees containing the said oxalates, crushing it sufficiently finely to liberate contained oxalate crystals, and subjecting the resulting material to physical concentration to separate out the oxalate.

2. A process for obtaining substantially insoluble oxalates according to claim 1 wherein prior to concentration soluble matters in the bark are extracted therefrom.

3. A process for obtaining calcium oxalate according to claim 1, wherein prior to concentration tannin in the bark is extracted therefrom.

4. A process for the treatment of the bark of trees containing substantially insoluble oxalates consisting in crushing it finely to liberate the oxalate crystals, removing fibrous matter, thereafter extracting with water to remove soluble substances and finally subjecting the material to physical concentration so as to obtain crystalline calcium oxalate.

5. A process according to claim 1 wherein the physical concentration is effected by subjecting the crushed material to water gravity separation.

6. A process for obtaining substantially insoluble oxalates consisting in taking the bark of trees containing the said oxalates, crushing it dry to a finely granulated condition to liberate the oxalate crystals, extracting the soluble matter with water, regrinding the residues in a wet condition to a size less than 60 mesh and subjecting the resulting material to physical concentration to separate out the oxalate.

In testimony whereof I hereto affix my signature in the presence of two witnesses, this 23d day of February, 1923.

WILLIAM ADOLF FRAYMOUTH.

Witnesses:
L. H. DALE,
R. F. CLARK.